Patented Sept. 22, 1942

2,296,427

UNITED STATES PATENT OFFICE 2,296,427

PROCESS OF PRODUCING AQUEOUS DISPERSIONS OF POLYISOBUTYLENE

Walter Daniel and Michael Otto, Ludwigshafen-on-the-Rhine, Germany, assignors, by mesne assignments, to Jasco, Incorporated, a corporation of Louisiana No Drawing. Application June 14, 1939, Serial No. 279,120. In Germany July 4, 1938

1 Claim. (Cl. 260—32)

The present invention relates to an improved process of producing aqueous dispersions of highly polymerised organic substances.

Highly polymerised organic substances are often used in the form of aqueous dispersions because these can be prepared in higher concentrations than solutions and consequently are more easy to work up.

Such dispersions can be obtained in many cases by polymerising the monomers in aqueous emulsion. Other monomeric substances, however, can only be polymerised with difficulty in aqueous emulsion or their polymerisation in the presence of solvents or in a block (i. e. in a coherent mass in the absence of any diluent) offers certain advantages for various reasons.

It has already been proposed to bring highly polymerised organic substances into aqueous dispersion by dispersing solutions of the substances in water and if desired removing the solvent. In this method difficulties are often encountered, however, because in particular when using very highly polymerised substances even low percentage solutions are almost stiff and can only be dispersed with difficulty. The dispersions are then usually stiff pastes which are difficult to work up and from which the solvent can be removed only with difficulty. Frequently coagulation even occurs so that no dispersions useful in practice are obtained.

We have now found that aqueous dispersions of highly polymeric organic waterinsoluble substances are readily obtained by dispersing in water liquid, or solid solutions of these substances in water-insoluble organic solvents in the presence of an emulsifying agent and of small amounts of a watersoluble organic liquid, and if desired removing the water-insoluble solvent and if desired also the watersoluble organic liquid again. Generally speaking a few per cent of the watersoluble organic liquid (calculated with regard to the amount of the water in which the highly polymeric substance is to be dispersed) are sufficient, but larger amounts can also be employed. The amount of the watersoluble organic liquid must, however, be in any case so small that the highly polymeric substance is not precipitated thereby from its solution in the waterinsoluble solvent. It is preferable to add to the solutions during the dispersion protective colloids, as for example glue, casein, polyacrylic acid sodium or ammonium salt, polyvinyl alcohol or watersoluble urea-formaldehyde condensation products or watersoluble cellulose derivatives.

Highly polymerised waterinsoluble substances which are especially suitable for the process are for example polyisobutylene, natural or synthetic rubber, polyvinyl compounds, such as acrylic and methacrylic acid esters and polyvinyl ethers and also cellulose derivatives, as for example benzyl cellulose.

As suitable watersoluble organic liquids there may be mentioned monohydric or polyhydric alcohols, such as methyl and ethyl alcohol, glycols, polyglycols and glycerine, low molecular ketones, such as acetone and methyl ethyl ketone, and cyclic ethers, as for example dioxane.

The addition of the watersoluble organic liquid may be effected at different points of time, i. e. before, during or after the addition of the water to the solution of the highly polymerised organic substance in a water-insoluble solvent.

The process may be carried out, for example in the case of polyisobutylene, as follows:

Polyisobutylene is dissolved in a water-insoluble solvent, as for example chlorbenzene, carbon tetrachloride, carbon bisulphide, methylene chloride, cyclohexane, benzine, benzene, toluene or xylene, liquid or solid solutions being obtained depending on the concentration of the solutions and the molecular weight of the polyisobutylene. The solvent process may be accelerated by shaking, kneading or rolling. To the solution there is then added a small amount of an emulsifying agent and water or an aqueous solution of the emulsifying agent and the solution of the highly polymerised substance is dispersed in the water or the solution of the emulsifying agent by intensive stirring, for example in a colloid mill, a homogenising machine, a turbo mixer or similar apparatus which ensure a fine dispersion. Thin to viscous pastes—dispersions of the type water-in-oil—are thus formed.

After adding small amounts of a watersoluble organic liquid these pastes immediately become mobile. There is formed a dispersion of the oil-in-water type. By adding the watersoluble organic liquid, the formation of a stable dispersion is considerably accelerated and in many cases rendered possible for the first time. This is advantageous and of great importance because by too long a treatment of the solutions in emulsifying apparatus, the polyisobutylene becomes degraded to products of lower molecular weight.

The watersoluble organic liquid, depending on its boiling point, may be removed together with that insoluble in water by distillation, but may also be left in the dispersion. The recovered solvent may be used again without further purification.

The aqueous dispersions thus obtained may be thickened to higher concentrations, i. e. up to a solid content of for example 50 per cent or more, for example by vacuum distillation, or creamed by adding watersoluble highly polymeric substances in the manner known for rubber latex or by centrifuging or several of the said methods.

In order to avoid an undesirable enrichment of the emulsifier or the protective colloid, the solvent may be continuously distilled off simultaneously with the preparation of the dispersion, fresh solution of the highly polymerised substance being added continuously to the dispersion freed wholly or partly from solvent, and then dispersed.

The aqueous dispersions thus obtainable are, contrasted with the solutions, mobile and readily filterable so that mechanical impurities may readily be removed. They may be diluted to any extent, fillers and dyestuffs may be added and they may be mixed with dispersions of other substances, as for example asphalt or bitumen, and also highly polymerised substances, as for example with rubber latex or similar artificial latices. Mixtures of rubber latex and the said dispersions may also be vulcanised.

The dispersions may be used in the same way as other known dispersions of highly polymerised substances, as for example for the preparation of coatings, impregnations, as painting pastes for textiles, as for example for the preparation of auto covering materials, for the preparation of immersion bodies, and as adhesives and binding agents.

The following examples will further illustrate how this invention may be carried out in practice but the invention is not restricted to these examples. The parts are by weight.

*Example 1*

10 parts of triethanolamine mono-oleic acid ester and 40 parts of glycerine are added to a solution of 250 parts of polyisobutylene having a molecular weight of 200,000 in 4750 parts of chlorbenzene. The solution is then stirred in a turbo mixer with 1500 parts of 0.5 per cent casein solution containing small amounts of ammonia for increasing the solubility of the casein in water. Within a few minutes a mobile dispersion is formed from the paste first formed. After expelling the chlorbenzene in a current of steam, a from 10 to 15 per cent solvent-free dispersion is obtained which may be concentrated in vacuo for example to a content of 30 per cent of polyisobutylene.

For more rapid production of the solution of polyisobutylene in chlorbenzene it is preferable to swell the polyisobutylene on the rollers or in a kneader with some chlorbenzene and then to shake or stir vigorously after the addition of the water and the watersoluble solvent.

Instead of chlorbenzene, carbon tetrachloride may be used in the same way. The carbon tetrachloride is preferably distilled off from the dispersion under ordinary pressure without steam. The resulting dispersion may be concentrated in vacuo to the desired concentration, as for example to 50 per cent polyisobutylene content or more.

Instead of 40 parts of glycerine, there may also be used 28 parts of ethyl alcohol, 28 parts of acetone or 40 parts of dioxane, or even less of these solvents.

*Example 2*

160 parts of polyisobutylene having a molecular weight of 150,000 are dissolved in 3840 parts of carbon tetrachloride and 5 parts of sodium oleate or 8 parts of normal-butyl-alphanaphthalene sulphonic acid sodium salt are added and, after the addition of 60 parts of methanol dispersed in 1200 parts of water in the manner described in Example 1.

In the same way a solution of 800 parts of polyisobutylene having a molecular weight of 60,000 may be dispersed in 3200 parts of carbon tetrachloride, and also solutions of polyisobutylene of still lower molecular weight, as for example 15,000. These dispersions leave behind when dried adhesive films and are especially suitable as adhesives.

*Example 3*

400 parts of polyvinyl isobutyl ether having a K-value of from 100 to 105 (for K-value see "Cellulose chemie" 1932, pages 58 and 71) are dissolved in 3600 parts of carbon tetrachloride and converted into a mobile dispersion in a turbo mixer with the addition of 1000 parts of 0.5 per cent aqueous casein solution containing a small amount of ammonia, 12 parts of sodium oleate and 24 parts of ethyl or methyl alcohol. The carbon tetrachloride used is removed from the dispersion by distillation at ordinary pressure. The dispersion thus obtained may be concentrated to a solid content of from 30 to 50 per cent.

*Example 4*

360 parts of a butadiene rubber having a K-value of 85 obtained by polymerisation with sodium are dissolved in 3240 parts of carbon tetrachloride and worked up into a mobile dispersion in a turbo mixer with an addition of 1000 parts of 0.5 per cent casein solution containing a small amount of ammonia, 12 parts of sodium or ammonium oleate and 40 parts of ethyl alcohol. After removing the carbon tetrachloride, the resulting dispersion may be concentrated to a solid content of 30 per cent or more.

Butadiene polymerisation products of higher molecular weight, as for example of a K-value of 115, may also be converted into aqueous dispersions, in the same way.

*Example 5*

300 parts of benzyl cellulose are dissolved in 2700 parts of methylene chloride or chlorbenzene and stirred in a turbo mixer with 750 parts of 0.3 per cent casein solution containing a small amount of ammonia, 10 parts of sodium oleate and 30 parts of acetone. The major portion of the solvent is removed from the resulting dispersion by distillation under normal pressure; if desired the dispersion may then be concentrated in vacuo to a solid content of 30 per cent or more.

*Example 6*

150 parts of polyisobutylene having a molecular weight of 200,000 are dissolved in 3700 parts of carbon tetrachloride and mixed in a turbo mixer with 1000 parts of water containing 5.5 parts of sodium oleate and with a solution of 16.7 parts of polystyrene in 100 parts of carbon tetrachloride. After the addition of 30 parts of ethyl alcohol a readily mobile dispersion is formed from which the carbon tetrachloride is distilled off if desired under reduced pressure. The dispersion free from solvents thus obtained is concentrated to the desired solid contents as for example a solid content of 50 per cent. The dispersion yields solid non-tacky films, foils or coatings either by evaporating the solvent or by coagulating and rolling the coagulate on hot rollers.

An aqueous dispersion of polyisobutylene obtained in the manner described in the preceding paragraph may also be added with an aqueous dispersion of polystyrene such as is obtained by polymerizing styrene in aqueous emulsion. Thus solid non-tacky films and foils are also obtained.

What we claim is:

A process of producing aqueous dispersions of polyisobutylene which comprises dispersing in water a solution of polyisobutylene in a water insoluble, volatile, organic solvent in the presence of an emulsifying agent and of a water soluble organic liquid which is a non-solvent for the polyisobutylene in small amounts insufficient to precipitate said polyisobutylene from solution in said water insoluble, organic solvent, and distilling off the vaporizable organic constituents thereby forming stable aqueous dispersions of polyisobutylene free from volatile organic solvents and non-solvents.

WALTER DANIEL.
MICHAEL OTTO.